United States Patent [19]
Donohue et al.

[11] Patent Number: 5,478,584
[45] Date of Patent: Dec. 26, 1995

[54] FREEZING SYSTEM

[75] Inventors: Stephen F. Donohue; Richard R. Royal, both of Fayetteville, Ark.

[73] Assignee: Tyson Holding Company, Wilmington, Del.

[21] Appl. No.: 388,715

[22] Filed: Feb. 15, 1995

[51] Int. Cl.$^6$ .................................................. B23B 4/06
[52] U.S. Cl. ........................ 426/644; 62/65; 62/374; 62/380; 426/393; 426/524
[58] Field of Search .......................... 62/63, 374, 380, 62/65; 426/393, 524, 644

[56] References Cited

U.S. PATENT DOCUMENTS

| | | | |
|---|---|---|---|
| 3,695,056 | 10/1972 | Glynn et al. | 62/168 |
| 3,783,633 | 1/1974 | Glynn et al. | 62/168 |
| 3,815,377 | 6/1974 | Tyree | 62/62 |
| 4,086,784 | 5/1978 | Wagner | 62/344 |
| 4,127,008 | 11/1978 | Tyree | 62/62 |
| 4,137,723 | 2/1979 | Tyree | 62/64 |
| 4,333,318 | 6/1982 | Tyree | 62/374 |
| 4,344,291 | 8/1982 | Tyree et al. | 62/62 |
| 4,377,402 | 3/1983 | Crowe et al. | 62/10 |
| 4,476,686 | 10/1984 | Madsen et al. | 62/381 |
| 4,481,782 | 11/1984 | Mukerjee | 62/380 |
| 4,594,253 | 6/1986 | Fradin | 426/393 |
| 4,693,737 | 9/1987 | Tyree | 62/10 |
| 4,695,302 | 9/1987 | Tyree | 62/10 |
| 5,020,330 | 6/1991 | Rhoades et al. | 62/63 |
| 5,042,262 | 8/1991 | Gyger et al. | 62/64 |
| 5,059,407 | 10/1991 | Wallace et al. | 423/421 |
| 5,121,611 | 6/1992 | Broderdorf et al. | 62/374 |
| 5,170,631 | 12/1992 | Lang et al. | 62/63 |
| 5,259,212 | 11/1993 | Engler | 62/266 |

Primary Examiner—Ronald C. Capossela
Attorney, Agent, or Firm—Dougherty, Hessin, Beavers & Gilbert

[57] ABSTRACT

A cooling system, a cooling method utilizing the inventive cooling system, and a chicken product formed using the inventive method. The inventive cooling system comprises: (a) a tunnel-type cooler housing; (b) a first treatment zone provided in the housing for treating articles by injecting carbon dioxide into the first treatment zone toward the articles and by circulating carbon dioxide in the first treatment zone; (c) a second treatment zone provided in the housing for further treating the articles by injecting carbon dioxide into the second treatment zone toward the articles and by circulating carbon dioxide in the second treatment zone; and (d) a conveyor assembly for conveying the articles through the first and second treatment zones. The carbon dioxide injected into the second treatment zone impinges on the articles to a greater degree than does the carbon dioxide injected into the first treatment zone. Further, the circulation of carbon dioxide in the first and second treatment zones is conducted in a manner such that a greater degree of turbulence is created in the second treatment zone than is created in the first treatment zone.

51 Claims, 6 Drawing Sheets

FREEZING SYSTEM

FIELD OF THE INVENTION

The present invention relates to tunnel-type freezer systems. More particularly, but not by way of limitation, the present invention relates to tunnel-type freezer systems for freezing chicken and other food products.

BACKGROUND OF THE INVENTION

Tunnel-type cryogenic freezers have been used heretofore primarily for freezing fruits, vegetables, and pizza. Food products conveyed through tunnel-type cryogenic freezers are directly cooled and/or frozen by contact with carbon dioxide snow and carbon dioxide gas. In some fruit, vegetable, and pizza freezing systems, tunnel-type $CO_2$ freezers have been installed upstream of existing mechanical freezers (e.g., existing spiral-type freezers using coolants such as ammonia) in order to provide increased system capacity.

A typical tunnel-type cryogenic freezer will consist of: an elongate freezer housing having a warm food product inlet at one end thereof and a cooled food product outlet at the other end thereof; a series of fans and $CO_2$ spray headers contained within the freezer housing; and a conveyor assembly for conveying the food product through the freezer housing from the inlet end to the outlet end thereof. The conveyor assembly will typically include an open conveyor belt (e.g., a flat wire, flexible, open belt) which will allow carbon dioxide snow and gas coolant to flow therethrough.

The $CO_2$ delivery valves commonly used in tunnel-type freezers are "Praso" valves of the type disclosed in U.S. Pat. No. 3,815,377, the entire disclosure of which is incorporated herein by reference. Praso valves are commercially available, for example, from Robert Shaw Company, Knoxville, Tenn. and from other commercial manufacturers. During operation, each Praso valve will have a Praso valve flow nozzle provided therein. The particular Praso valve nozzle employed will determine the velocity and flow pattern of the $CO_2$ delivered by the valve. The nozzle will also determine the degree to which the delivered $CO_2$ impinges upon the food product being conveyed through the tunnel freezer.

It has been common practice heretofore to use identical fan blades, identical constant speed fan motors, identical Praso valve nozzles, identical Praso valve set pressures (typically about 100 scfh at 235–245 psig), and identical Praso valve/conveyor belt clearances throughout the entire length of the tunnel freezer. Thus, the degree to which the delivered $CO_2$ impinges upon the conveyed food product, the delivered ratio of $CO_2$ snow to $CO_2$ gas, and the degree of fan turbulence encountered by the conveyed food product has been substantially constant along the entire length of the tunnel freezer.

It is also noted that $CO_2$ supply pressure has heretofore been maintained at about 260 psig by controlled evaporation of $CO_2$ in the $CO_2$ supply system.

Some attempts have been made heretofore to use tunnel-type $CO_2$ freezers for fully freezing chicken products. In an effort to obtain adequate heat removal while minimizing $CO_2$ consumption per pound of product, high impingement (i.e., 30 mm barrel length) Praso valve nozzles and high fan circulation rates have been employed along the entire length of the freezer.

Unfortunately, the results obtained in these prior efforts have been largely disappointing, particularly when the chicken products in question were products having marination fluid and/or skin on the exterior thereof. Contrary to expectations, product dehydration and $CO_2$ consumption levels have been excessive. Moreover, the high impingement and turbulence levels employed in these prior efforts have caused skin loss, skin breakage, skin finger formation, marination fluid loss, and skin bubbling. Skin bubbling problems have been especially troublesome in the case of injection marinated products. In such applications, the needle injection hole formed during the marination injection process provides an opening through which impinging $CO_2$ can readily flow beneath the product skin.

Prior attempts at using tunnel-type $CO_2$ freezers for freezing chicken products have also been characterized by product streaking problems. Heretofore, in chicken freezing applications, each Praso valve header extending laterally across the width of the freezer conveyor belt has had five Praso valves attached thereto. Moreover, the Praso valve headers have typically been structured and arranged in the tunnel freezer such that the individual valves connected to the various valve headers have been aligned in linear relationships along the length of the freezer. Given a standard valve to belt clearance in the range of from 4 to 8 inches and using high impingement, 30 mm barrel Praso valve nozzles of the type heretofore employed for freezing chicken products, the overall spray pattern provided by each valve header has typically directly covered only about one-half of the total width of the conveyor belt. As a result, visible streaks have been formed on the surface of the frozen product.

When using a tunnel freezer for freezing pizza, excessive impingement of $CO_2$ coolant onto the surface of the pizza product could damage or remove the pizza toppings. Thus, in $CO_2$ tunnel freezers used heretofore for freezing pizza, flat plate orifices (i.e., valve nozzles having barrel lengths of 0 mm) have been employed throughout the freezer in all of the $CO_2$ valves. When flat plate orifices are employed, the $CO_2$ coolant does not substantially impinge on the pizza product. Rather, the flat plate orifices provide a relatively gentle $CO_2$ snow blanket which deposits on the pizza product. As a result of their use in pizza freezers, flat plate orifices are commonly referred to as pizza orifices.

Unfortunately, the use of tunnel-type pizza freezers for freezing chicken products would be economically prohibitive due to the fact that several pizza freezers, aligned in series, would be required to obtain an adequate amount of cooling.

SUMMARY OF THE INVENTION

The present invention provides a tunnel freezer system which is ideally suited for freezing raw or cooked chicken products. The inventive freezer system can also be used for freezing generally any other type of food product. The inventive freezer system provides excellent product moisture retention while minimizing $CO_2$ consumption. Using the inventive system, the moisture loss realized for producing a completely frozen chicken product can be as low as from about 0.2 to about 0.35% by weight based on the total weight of the warm product prior to freezing. Additionally, the inventive tunnel freezer system substantially eliminates skin loss, skin damage, marination fluid loss, skin bubbling, and product streaking problems.

In one embodiment, the present invention provides a cooling system comprising: (a) a tunnel-type cooler housing; (b) a first treatment zone provided in the housing for treating articles by injecting carbon dioxide into the first treatment zone toward the articles and by circulating carbon dioxide in the first treatment zone; (c) a second treatment zone provided in the housing for further treating the articles by injecting carbon dioxide into the second treatment zone toward the articles and by circulating carbon dioxide in the second treatment zone; and (d) a conveyor means for conveying the articles through the first and second treatment zones. The treatment zones are preferably operable such that the carbon dioxide injected into the second treatment zone impinges on the articles to a greater degree than does the carbon dioxide injected into the first treatment zone. The treatment zones are also preferably operable such that when carbon dioxide is circulated therein, a greater degree of turbulence is created in the second treatment zone than is created in the first treatment zone. The inventive cooling system can further include a mechanical freezer and a transferring means for transferring the articles from the conveyor means to the mechanical freezer.

The present invention further provides a method of treating articles. The inventive method comprises the steps of: (a) conveying the articles through a first treatment zone provided in a tunnel-type cooler; (b) as the articles are conveyed through the first treatment zone, injecting carbon dioxide into the first treatment zone toward the articles and circulating carbon dioxide in the first treatment zone; (c) following step (a), conveying the articles through a second treatment zone provided in the tunnel-type cooler; and (d) as the articles are conveyed through the second treatment zone, injecting carbon dioxide into the second treatment zone toward the articles and circulating carbon dioxide in the second treatment zone. In the inventive method, the carbon dioxide injected into the second treatment zone in accordance with step (d) impinges on the articles to a greater degree than does the carbon dioxide injected into the first treatment zone in accordance with step (b). Further, carbon dioxide is preferably circulated in the treatment zones in steps (d) and (b) in a manner such that a greater degree of turbulence is created in the second treatment zone during step (d) than is created in the first treatment zone during step (b). The inventive method can also include the step, following step (e), of conducting the articles through a mechanical freezer.

The present invention also provides a novel chicken product. The inventive chicken product is formed by a method comprising the steps of: (a) conveying chicken items (e.g., chicken breast fillets) through a first treatment zone provided in a tunnel-type cooler; (b) as the chicken items are conveyed through the first treatment zone, injecting carbon dioxide into the first treatment zone toward the chicken items and circulating carbon dioxide in the first treatment zone; (c) following step (a), conveying the chicken items through a second treatment zone in the tunnel-type cooler; and (d) as the chicken items are conveyed through the second treatment zone, injecting carbon dioxide into the second treatment zone toward the chicken items and circulating carbon dioxide in the second treatment zone. Upon injection, the carbon dioxide injected into the first treatment zone in step (b) forms a carbon dioxide snow blanket which deposits on the chicken items. The carbon dioxide injected into the second treatment zone in accordance with step (d), however, impinges on the chicken items to a greater degree than does the carbon dioxide injected into the first treatment zone in accordance with step (b). Additionally, carbon dioxide is preferably circulated in the treatment zones in steps (b) and (d) in a manner such that a greater degree of turbulence is created in the second treatment zone during step (d) than is created in the first treatment zone during step (b). Further, the method used for forming the inventive chicken product can include the step, following step (c), of freezing the chicken items in a mechanical freezer.

The present invention allows each treatment zone of the inventive tunnel freezer to be operated such that optimum heat removal is obtained therein while preserving and/or obtaining a desired final product quality. Examples of pertinent product quality parameters include: appearance, moisture content, texture, shape and color.

When, for example, the inventive system is used for freezing chicken products having skin and/or sauce on the exterior thereof, each of the initial tunnel freezer treatment zones prepares the product for treatment in subsequent tunnel freezer treatment zones so that product damage is avoided. The first zone of the inventive tunnel freezer system preferably constitutes a snow blanketing stage wherein (a) the viscosity of any marination fluid or other sauce provided on the exterior of the chicken product is increased such that the sauce is substantially more resistant to flow and (b) any skin provided on the exterior of the chicken product is substantially stiffened. As a result, a substantially greater degree of impingement and turbulence can be applied to the exterior of the chicken product in the second treatment zone without damaging or removing the product skin and/or sauce.

It is also noted that the surface of a raw chicken product being conveyed through the inventive system will typically freeze after being present in the tunnel freezer for only about one minute. In contrast, when a similar product is frozen using only a mechanical freezer, the surface of the product typically does not freeze until the product has been present in the mechanical freezer for in the range of from about 10 to about 15 minutes. By greatly reducing the amount of time required to freeze the surface of the chicken product, the inventive system substantially reduces dehydration and drip losses and thereby provides a significantly moister and juicier product.

Further objects, features, and advantages of the present invention will be apparent to those skilled in the art upon reference to the accompanying drawings and upon reading the following description of the preferred embodiments.

DESCRIPTION OF THE PREFERRED EMBODIMENTS

Figure 1:
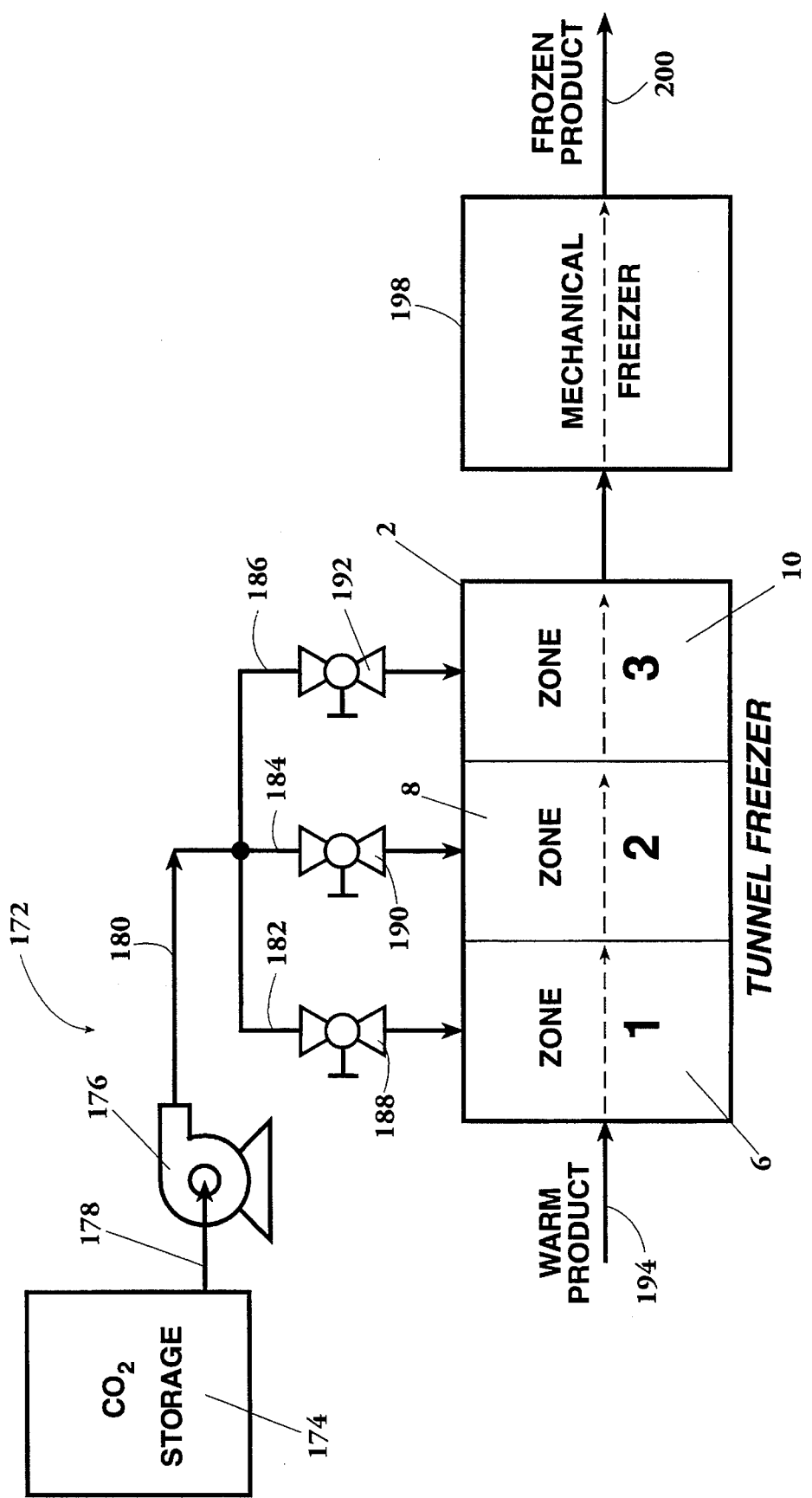
FIG. 1 provides a schematic diagram of an inventive freezer system including a mechanical freezer 198.
Figure 2:
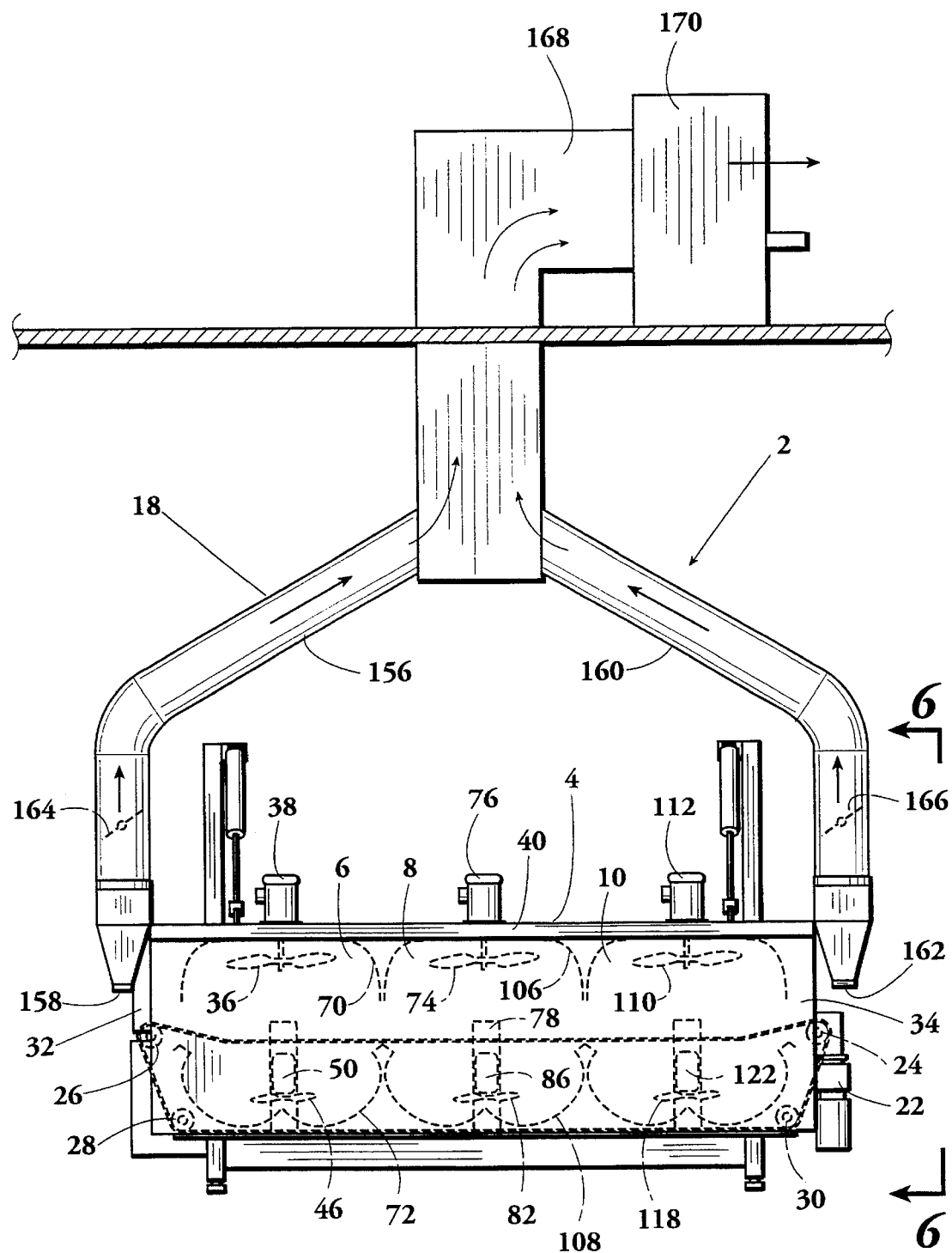
FIG. 2 provides an elevational front view of a tunnel freezer 2 provided by the present invention.
Figure 3:
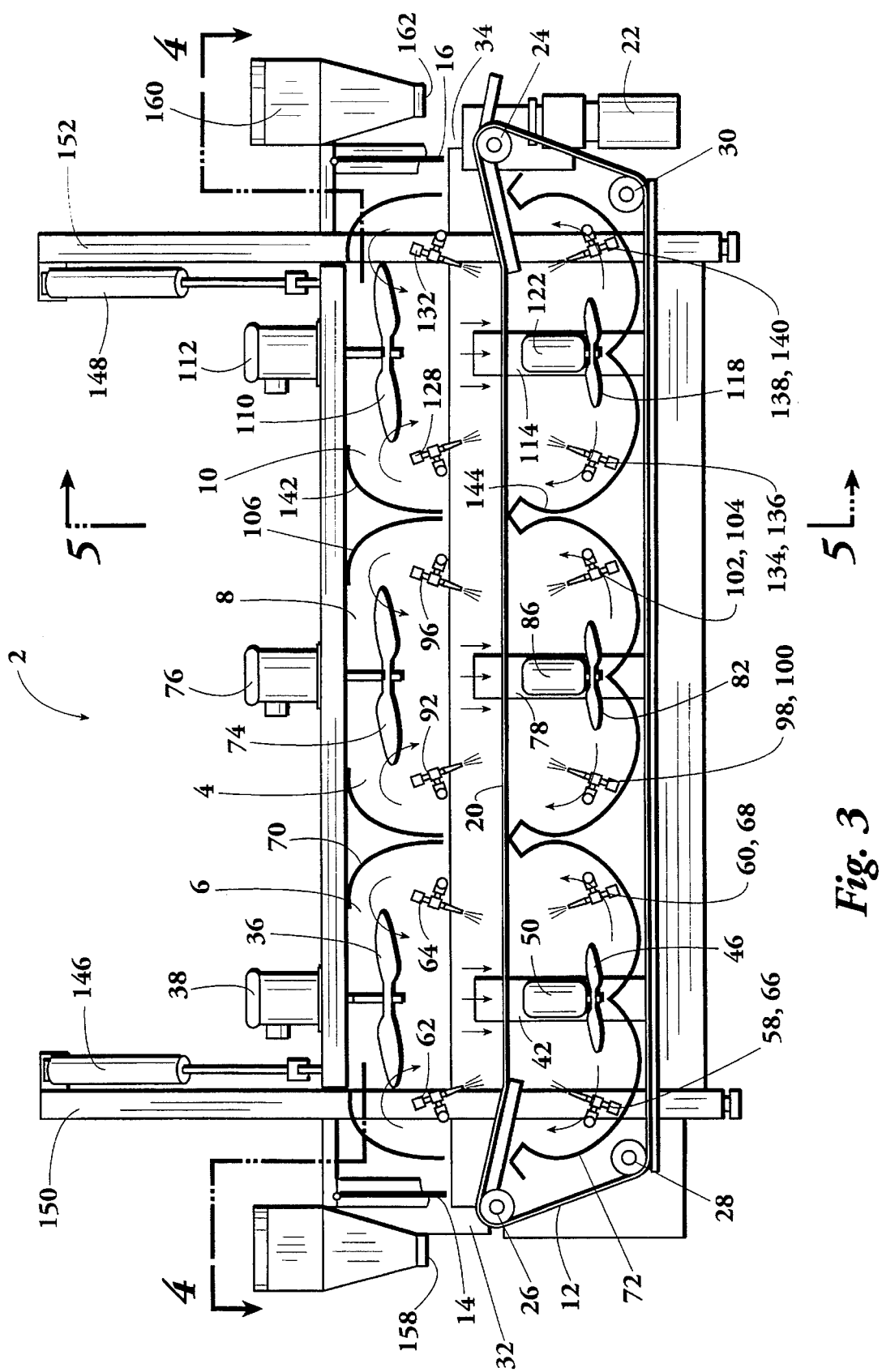
FIG. 3 provides a cutaway elevational front view of inventive tunnel freezer 2.

An embodiment 2 of a novel tunnel freezer provided by the present invention is depicted in FIGS. 1–6. Inventive tunnel freezer 2 comprises an elongate housing 4 having a first treatment zone 6, a second treatment zone 8, and a third treatment zone 10 provided therein. Inventive tunnel freezer 2 further comprises: a conveyor assembly 12; an entrance curtain 14; an exit curtain 16; and a freezer exhaust discharge system 18.

Conveyor assembly 12 comprises: a conveyor belt 20; a conveyor belt drive motor 22 secured to housing 4; a conveyor belt drive roller 24 which is driven by motor 22 and is positioned at the exit end opening 34 of freezer 2; an entrance guide roller 26 rotatably positioned at the entrance end of housing 4; and return rollers 28 and 30 rotatably connected in the interior bottom portion of housing 4. Conveyor belt 20 extends from the entrance end opening 32 of housing 4 to the exit end opening 34 of housing 4. Conveyor belt 20 is preferably a one-half inch by one-half inch flat wire, flexible, open belt which will readily allow carbon dioxide snow and gas to pass therethrough.

The first treatment zone 6 of inventive freezer 2 comprises: a top fan 36 positioned above belt 20 and having a fan motor 38 secured to the cover 40 of housing 4; a lower fan brace 42 secured in the lower portion of first treatment zone 6 and having a crossmember 44 extending laterally across the interior of housing 4; two bottom fans 46 and 48 positioned below conveyor belt 20 and having fan motors 50 and 52 secured to crossmember 44; a first upper $CO_2$ valve header 54 positioned upstream of top fan 36 and extending laterally above conveyor belt 20 from the back of housing 4; a second upper $CO_2$ valve header 56 positioned downstream of top fan 36 and extending laterally above conveyor belt 20 from the back of housing 4; a first lower $CO_2$ valve header 58 positioned upstream of bottom fans 46 and 48 and extending laterally beneath conveyor belt 20 from the back of housing 4; and a second lower $CO_2$ valve header 60 positioned downstream of bottom fans 46 and 48 and extending laterally beneath conveyor belt 20 from the back of housing 4.

Assuming that conveyor belt 20 is approximately 40 inches wide, each of valve headers 54, 56, 58, and 60 will preferably have about seven Praso valves 62, 64, 66, and 68 connected thereto. Upper valves 62 and 64 are preferably directed downwardly toward conveyor belt 20 at an angle in the range of from about 15° to about 30° from vertical. Further, each of lower valves 66 and 68 is preferably directed vertically upward toward conveyor belt 20 at an angle in the range of from about 15° to about 30° from vertical.

Upper valve headers 54 and 56 are preferably positioned in housing 4 such that the amount of clearance between valves 62 and 64 and the top of conveyor belt 20 is in the range of from about 3 to about 9 inches. The amount of clearance between valves 62 and 64 and the top of conveyor belt 20 is most preferably about 6.5 inches. Lower valve headers 58 and 60 are preferably positioned in housing 4 such that the amount of clearance between valves 66 and 68 and the bottom of conveyor belt 20 is in the range of from about 4 to about 6 inches. The amount of clearance between valves 66 and 68 and the bottom of conveyor belt 20 is most preferably about 5 inches.

The flow nozzles used in Praso valves 62, 64, 66, and 68 are preferably nozzles which will produce, at most, a very low degree of impingement on articles being conveyed through freezer 2. Most preferably, the flow nozzles used in Praso valves 62, 64, 66, and 68 are flat plate orifices.

First zone top fan 36 and bottom fans 46 and 48 are preferably controlled such that a relatively low level of turbulence is maintained in first treatment zone 6. Preferably, the level of turbulence maintained in first treatment zone 6 is an amount which does not substantially exceed that which is sufficient to prevent the accumulation of carbon dioxide snow in first treatment zone 6. Most preferably, fan motors 38, 50, and 52 are variable speed motors whereby the speed(s) of fans 36, 46, and 48 can be selectively controlled to obtain a desired degree of turbulence in first treatment zone 6.

Top fan 36 preferably operates to circulate $CO_2$ downward through the center of first treatment zone 6. Bottom fans 46 and 48, on the other hand, preferably operate to receive the $CO_2$ delivered by top fan 36 and recirculate the $CO_2$ upward around the perimeter of first treatment zone 6. Curved baffles 70 and 72 are provided in the top and bottom of first treatment zone 6 to facilitate the recirculation of carbon dioxide within first treatment zone 6.

Like first treatment zone 6, second treatment zone 8 preferably includes: a top fan 74; a top fan motor 76 connected to housing cover 40; a lower fan brace 78; a lower fan brace crossmember 80; two bottom fans 82 and 84; two bottom fan motors 86 and 88; a first upper $CO_2$ valve header 90 positioned upstream of top fan 74; seven Praso valves 92 connected to valve header 90 and positioned in substantially the same manner as valves 62; a second upper $CO_2$ valve header 94 positioned downstream of top fan 74; seven Praso valves 96 connected to valve header 94 and positioned in substantially the same manner as Praso valves 64; a first lower carbon dioxide valve header 98 positioned upstream of bottom fans 82 and 84; seven Praso valves 100 connected to valve header 98 and positioned in substantially the same manner as Praso valves 66; a second lower $CO_2$ valve header 102 positioned downstream of bottom fans 82 and 84; seven Praso valves 104 connected to valve header 102 and positioned in substantially the same manner as Praso valves 70; and curved circulation baffles 106 and 108 provided above and below conveyor belt 20.

Second treatment zone 8 differs from first treatment zone 6 in that the particular flow nozzles, valve clearances, and fan circulation rates used in second treatment zone 8 provide a greater degree of $CO_2$ impingement and circulation turbulence than is provided in first treatment zone 6. Higher degrees of impingement and turbulence can be used in second treatment zone 8 due to the fact that the treatment of the food product in first treatment zone 6 increases the ability of the product to withstand greater impingement and turbulence forces. Most preferably, the degrees of impingement and turbulence used in second treatment zone 8 will exceed the degrees of impingement and turbulence used in first treatment zone 6 such that the impingement and turbulence forces acting on the food product in second treatment zone 8 approach the maximum impingement and turbulence forces which can be applied to the product in second treatment zone 8 without damaging or otherwise reducing the quality of the product.

With regard to specific structural features affecting impingement and turbulence levels, second treatment zone 8 preferably differs from first treatment zone 6 in that: (a) the flow nozzles used in Praso valves 92, 96, 100, and 104 are preferably intermediate impingement nozzles having barrel lengths in the range of from about 2 to about 6 mm; (b) the clearance between upper valves 92 and 96 and the top of conveyor belt 20 is in the range of from about 3 to about 9 inches; the clearance between lower valves 100 and 104 and the bottom of conveyor belt 20 is in the range of from about 4 to about 6 inches; and the speed(s) and/or configuration(s) of fans 74, 82, and 84 is (are) such that the degree of turbulence created in second treatment zone 8 by fans 74, 82, and 84 exceeds the degree of turbulence created in first treatment zone 6 by fans 36, 46, and 48.

Most preferably, commercially available C-2 nozzles are used in each of Praso valves 92, 96, 100, and 104. The commercially available C-2 nozzle has a barrel length of about 2 mm. C-2 flow nozzles are available, for example, from Robert Shaw Company, Knoxville, Tenn. and from other commercial manufacturers.

As will be understood by those skilled in the art, various means can be used to create a greater degree of turbulence in second treatment zone 8 than is created in first treatment zone 6. Such means include, for example, using higher fan speeds, larger fan blades, increased fan blade pitch and/or higher $CO_2$ header pressures. Most preferably, increased turbulence is achieved in second treatment zone 8 by employing higher fan speeds while using fan blades which are substantially identical to the fan blades used in first treatment zone 6. To obtain higher fan speeds, the fan motors 76, 86, and 88 used in second treatment zone 8 can be either variable speed motors or constant speed motors which operate, or can be selectively adjusted to operate, at speeds exceeding the fan speeds used in first treatment zone 6.

As in first treatment zone 6 and in second treatment zone 8, third treatment zone 10 includes: a top fan 110; a top fan motor 112 connected to housing cover 40; a lower fan brace 114; a lower fan brace crossmember 116; two bottom fans 118 and 120; two bottom fan motors 122 and 124; a first upper $CO_2$ valve header 126 positioned upstream of top fan 110; seven Praso valves 128 connected to valve header 126 and positioned in substantially the same manner as valves 62; a second upper $CO_2$ valve header 130 positioned downstream of top fan 110; seven Praso valves 132 connected to valve header 130 and positioned in substantially the same manner as Praso valves 64; a first lower carbon dioxide valve header 134 positioned upstream of bottom fans 118 and 120; seven Praso valves 136 connected to valve header 134 and positioned in substantially the same manner as Praso valves 66; a second lower $CO_2$ valve header 138 positioned downstream of bottom fans 118 and 120; seven Praso valves 140 connected to valve header 138 and positioned in substantially the same manner as Praso valves 70; and curved circulation baffles 142 and 144 provided above and below conveyor belt 20.

Third treatment zone 10 differs from first treatment zone 6 and second treatment zone 8 in that the particular flow nozzles, $CO_2$ header pressures, valve clearances, and fan circulation rates employed in third treatment zone 10 provide (a) a greater degree of $CO_2$ impingement than is provided in second treatment zone 8 and (b) a degree of circulation turbulence which is substantially equivalent to or greater than the degree of circulation turbulence provided in second treatment zone 8. High degrees of turbulence and impingement can be used in third treatment zone 10 due to the fact that the treatment of the food product in first treatment zone 6 and in second treatment zone 8 enables the product to withstand greater impingement and turbulence forces. Most preferably, the degree of impingement used in third treatment zone 10 will exceed the degree of impingement used in second treatment zone 8 by an amount such that the impingement forces acting on the food product in third treatment zone 10 approach the maximum impingement forces which can be applied to the product in third treatment zone 10 without damaging or otherwise reducing the quality of the product.

In order to provide the high $CO_2$ impingement levels desired in third treatment zone 10, third treatment zone 10 preferably differs from first treatment zone 6 and from second treatment zone 8 in that: (a) the flow nozzles used in Praso valves 128, 132, 136, and 140 are high impingement nozzles having barrel lengths in the range of from about 25 to about 33 mm; (b) the amount of clearance between upper valves 128 and 132 and the top of conveyor belt 20 is in the range of from about 3 to about 9 inches; and (c) the amount of clearance between lower Praso valves 136 and 140 and the bottom of conveyor belt 20 is in the range of from about 4 to about 6 inches. The flow nozzles used in Praso valves 128, 132, 136, and 140 are most preferably commercially available, high impingement, C-30 nozzles. The C-30 nozzle has a barrel length of about 30 mm. C-30 nozzles are available, for example, from Robert Shaw Company, Knoxville, Tenn. and from other commercial manufacturers.

The degree of circulation turbulence preferred in third treatment zone 10 can be obtained through substantially any desired combination of fan blade sizes, $CO_2$ header pressures, fan blade pitches, fan motor speeds, etc. The fan blades used in third treatment zone 10 are preferably substantially identical to the fan blades used in first treatment zone 6 and in second treatment zone 8. Further, the fan motors used in third treatment zone 10 are preferably variable speed or constant speed motors which operate, or are capable of being adjusted to operate, at speeds at least matching the fan speeds used in second treatment zone 8. Fan motors 112, 122, and 124 are most preferably constant speed motors which operate at speeds which meet or exceed the operating speeds of the fan motors used in second treatment zone 8.

Figure 5:
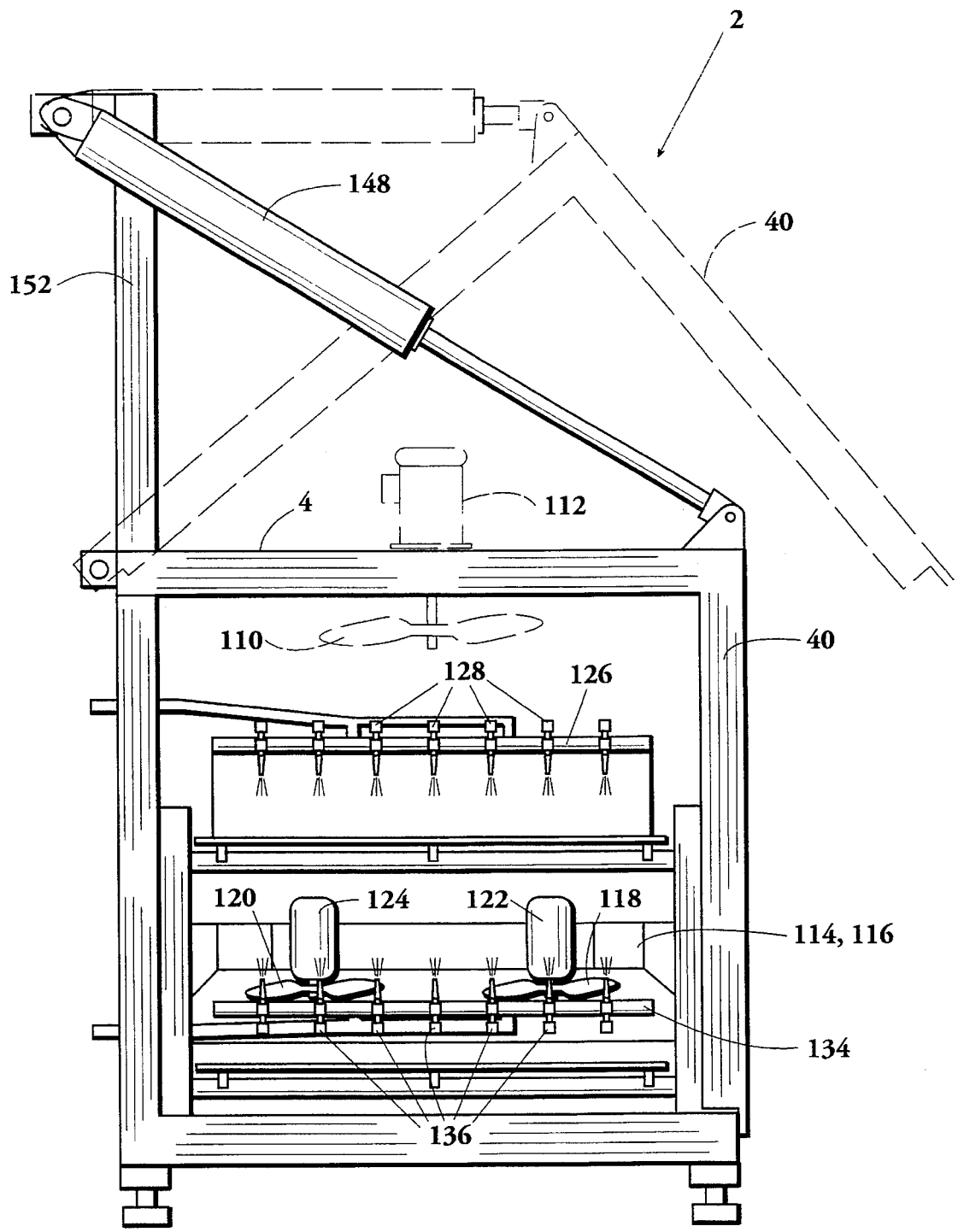
FIG. 5 provides a cutaway side view of inventive tunnel freezer 2 taken from perspective 5—5 shown in FIG. 3.

As indicated in FIG. 5, the cover 40 of housing 4 can be conveniently raised to allow access to the interior of inventive tunnel freezer 2. Cover 40 is lifted by means of a first hydraulic cylinder 146 provided near the entrance end of housing 4 and a second hydraulic cylinder 148 provided near the exit end of housing 4. Hydraulic cylinders 146 and 148 are operably connected between cover 40 and a pair of vertical supports 150 and 152 extending upwardly from the back of housing 4.

Figure 6:
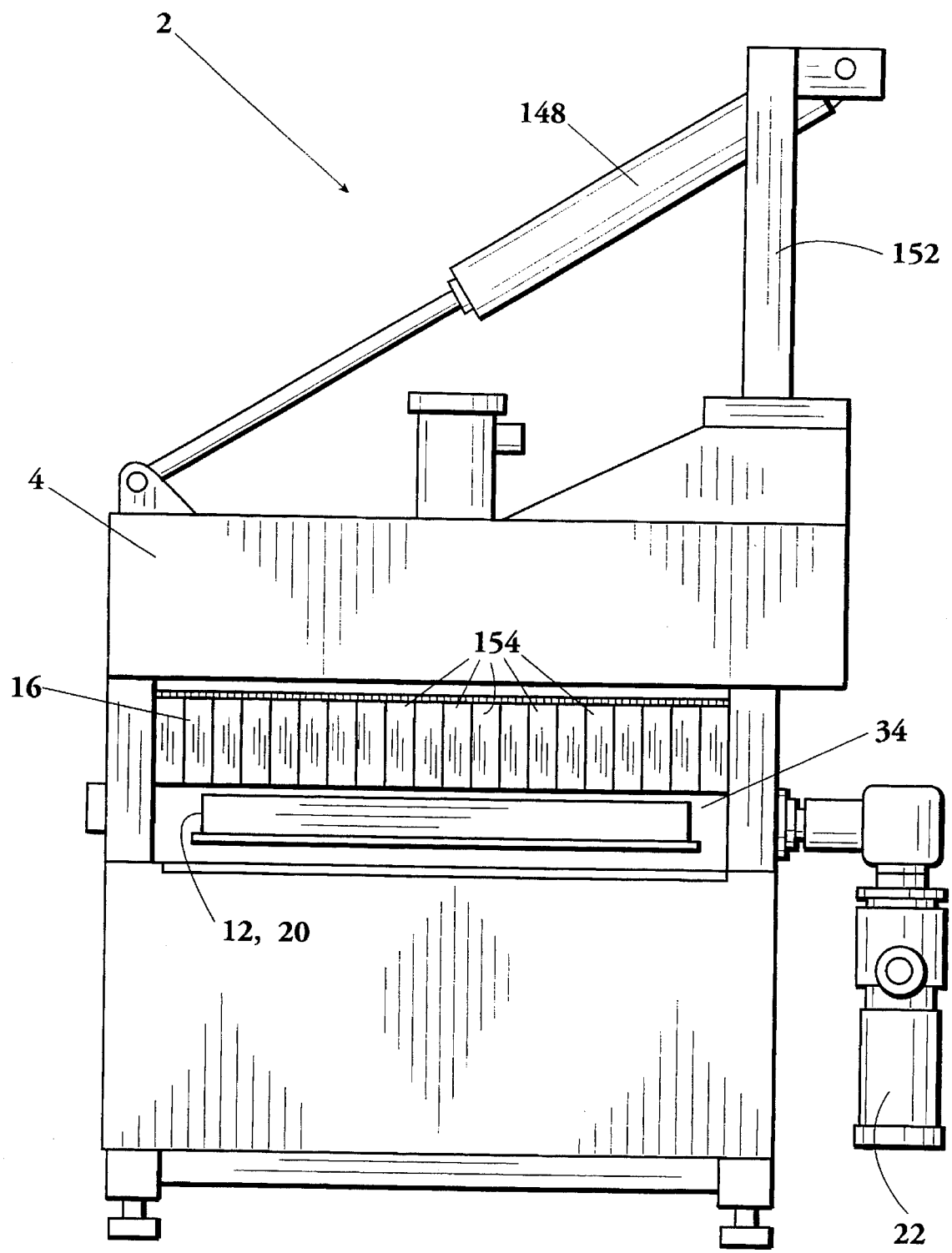
FIG. 6 provides an elevational view of the exit end of inventive tunnel freezer 2 taken from perspective 6—6 shown in FIG. 2.

Entrance curtain 14 and exit curtain 16 are substantially identical. Exit curtain 16 is depicted in FIG. 6. Each of curtains 14 and 16 preferably comprises a plurality of stainless steel, swinging curtain plates 154. As is common in the art, each of swinging plates 154 has a hinge-type top end placed on a vertically adjustable hinge rod extending across the width of the freezer opening. The clearance between entrance curtain 14 and the top of conveyor belt 20 is preferably about three inches. The clearance between exit curtain 16 and the top of conveyor belt 20 is preferably about 0.25 inches.

The exhaust discharge system 18 used in conjunction with inventive tunnel freezer 2 preferably comprises: an entrance pick-up duct 156 extending from the entrance end of housing 4; an entrance duct opening 158 positioned above and extending across the width of the freezer entrance for receiving carbon dioxide vapor escaping from the entrance opening end of freezer 2; an exhaust pick-up duct 160 extending from the exit end of housing 4; an exit duct opening 162 positioned above and extending across the width of the exit end of inventive freezer 2 for receiving carbon dioxide gas escaping from the exit end opening of freezer 2; an entrance duct damper 164 provided inside entrance duct 156 for adjusting the amount of exhaust system suction applied to the entrance end of freezer 2; an exit duct damper 166 provided in exit duct 160 for adjusting the amount of exhaust system suction applied to the exit end of inventive freezer 2; a blower entry duct 168 to which the ends of pick-up ducts 156 and 160 are connected; and a blower 170 which receives exhaust gas from duct 168 and expels the exhaust gas to the atmosphere.

As is shown in FIG. 1, the $CO_2$ delivery system 172 used for delivering $CO_2$ coolant to the first, second, and third treatment zones of inventive freezer 2 preferably comprises: a $CO_2$ storage vessel 174; a $CO_2$ delivery pump 176; a conduit 178 connected between vessel 174 and the suction of pump 176; a conduit 180 connected to the discharge of pump 176; a conduit 182 extending from conduit 180 to first treatment zone 6 of inventive freezer 2; a conduit 184 extending from conduit 180 to second treatment zone 8; a conduit 186 extending from conduit 180 to third treatment zone 10 of inventive freezer 2; a first zone valve 188 provided in conduit 182 for controlling the flow of $CO_2$ coolant to first treatment zone 6; a second zone valve 190 provided in conduit 184 for controlling the flow of $CO_2$ coolant to second treatment zone 8; and a third zone valve 192 provided in conduit 186 for controlling the flow of $CO_2$ coolant to third treatment zone 10.

At present, the flow of coolant to each of the first, second, and third treatment zones is preferably regulated by temperature control using top and bottom thermocouples provided in each treatment zone. These thermocouples are linked with conventional pneumatic, electrical, or other control systems which automatically and independently adjust valves 188, 190, and 192 to provide a desired temperature profile in the inventive freezer. Alternatively, the flow of $CO_2$ coolant to each of the first, second, and third treatment zones could be controlled by a system wherein valves 188, 190, and 192 are automatically and independently adjusted in accordance with the amount of food product being conveyed through the inventive freezer.

Unlike prior $CO_2$ tunnel freezer systems which utilize only $CO_2$ evaporation to maintain a $CO_2$ supply pressure not exceeding about 290 psig, $CO_2$ delivery pump 176 is preferably provided in the inventive system so that $CO_2$ coolant is supplied to inventive freezer 2 at a pressure in the range of from about 310 to about 350 psig. Increasing the $CO_2$ supply pressure in this manner increases the quality (i.e., increases the liquid to vapor ratio) of the $CO_2$ coolant and thereby increases the amount of $CO_2$ snow which is formed when the $CO_2$ coolant is discharged into the freezer treatment zones. Increased $CO_2$ snow production resulting from improved coolant feed quality particularly enhances the heat transfer results obtained in first treatment zone 6. As mentioned hereinabove, as the food product is conveyed through first treatment zone 6, it is preferably covered therein with a $CO_2$ snow blanket. Applying a $CO_2$ snow blanket to the food product in first treatment zone 6 provides the maximum heat removal obtainable in zone 6 without damaging or otherwise reducing the quality of the product.

As indicated above, assuming that conveyor belt 20 is approximately 40 inches wide, each of the $CO_2$ valve headers provided in freezer housing 4 preferably has seven Praso valves connected thereto. Thus, each valve header includes a greater number of Praso valves than has typically been used heretofore for freezing chicken products. Increasing the number of Praso valves in this manner significantly increases the degree of direct belt coverage provided by each valve header.

Figure 4:
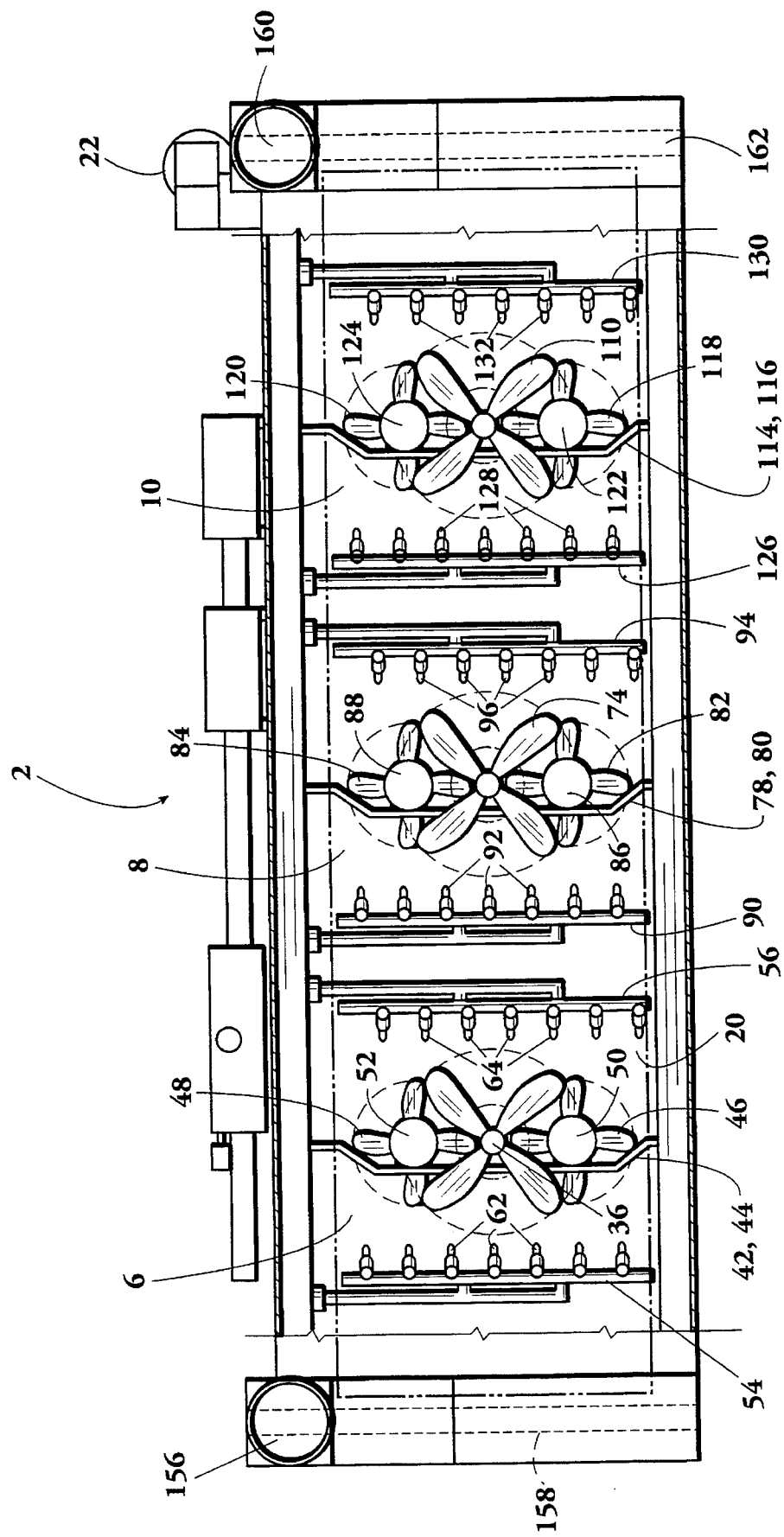
FIG. 4 provides a cutaway top view of inventive tunnel freezer 2 taken from perspective 4—4 shown in FIG. 2.

In addition to utilizing a greater number of Praso valves per valve header, the inventive freezer system employs a staggered valve arrangement to thereby ensure complete belt coverage and eliminate streaking problems. Specifically, as seen in FIG. 4, the valves connected to headers 54, 58, 90, 98, 126, and 134 are aligned in a first linear relationship along the length of inventive freezer 2. As also seen in FIG. 4, the valves connected to headers 56, 60, 94, 102, 130, and 138 are aligned in a second linear relationship along the length of inventive freezer 4. Moreover, the linear arrangement of the valves connected to headers 56, 60, 94, 102, 130, and 138 is offset (or staggered) from the linear relationship of the valves connected to headers 54, 58, 90, 98, 126, and 134. As a result of this staggered valve relationship, any coverage gaps existing between adjacent valves in a given header are covered by the valves connected to an adjacent header.

Due to the fact that (1) the inventive freezer system utilizes a $CO_2$ coolant supply pressure which substantially exceeds the $CO_2$ supply pressure used heretofore, (2) the use of a greater number of Praso valves in the inventive freezer operates to reduce the amount of $CO_2$ delivered by each individual Praso valve, (3) the amount of $CO_2$ delivered by each individual Praso valve is further reduced in that the inventive freezer system utilizes less $CO_2$ coolant per pound of product than has heretofore been possible, and (4) substantial differences exist in the manner in which the Praso valves of the various treatment zones of the inventive freezer system are operated, the set pressures of the individual Praso valves used in the inventive freezer system (a) are substantially higher than the Praso valve set pressures used heretofore in prior tunnel freezer systems and (b) vary substantially from treatment zone to treatment zone.

The specific preferred set pressures of the individual Praso valves used in inventive freezer 2 will vary depending upon the actual dimensions of the inventive freezer, the amount of product conveyed through the freezer, the inlet heat content of the product, and the desired outlet heat content of the product. However, typically, Praso valves 62, 64, 66, and 68 contained in first treatment zone 6 will be set to deliver 100 scfh of $CO_2$ at a pressure in the range of from about 265 psig to about 290 psig, valves 92, 96, 100, and 104 contained in second treatment zone 8 will be set to deliver 100 scfh of $CO_2$ at a pressure in the range of from about 280 to about 300 psig, and valves 128, 132, 136, and 140 contained in third treatment zone 10 will be set to deliver 100 scfh of $CO_2$ at a pressure in the range of from about 295 psig to about 325 psig.

In the method of the present invention, a food product (e.g., a chicken product having skin and/or a sauce on the exterior thereof) is delivered to the entrance of inventive tunnel freezer 2 by a standard wire belt conveyor or by generally any other means 194 used in the art for delivering a food product to the entrance of a tunnel freezer. Conveyor belt 20 then conveys the product sequentially through first treatment zone 6, second treatment zone 8, and third treatment zone 10 of inventive tunnel freezer 2.

If desired, the cooled product exiting inventive tunnel freezer 2 can be carried to a mechanical freezer 198, or to some other type of additional treatment device, by means of a standard wire belt conveyor 196 or by generally any other type of carrying device commonly used in the art. Within mechanical freezer 198, the cooled food product is completely frozen to provide a frozen product 200.

Mechanical freezer 198 is preferably a spiral freezer utilizing an ammonia coolant.

When an inventive freezer system of the type depicted in FIG. 1 is used for freezing a chicken product comprised of chicken portions having skin and/or a sauce on the exterior thereof, the inventive freezer system will typically be configured and operated such that: conveyor belt 20 is approximately 40 inches wide; each treatment zone 6, 8, and 10 provided in freezer 2 is about four feet long; conveyor belt 20 is operated at a speed of about 10 feet per minute; the food product is loaded on conveyor belt 20 in an amount in the range of from about 2.2 to about 2.5 pounds per $ft^2$; assuming a warm product inlet temperature in the range of from about 180° F. to about 40° F., the food product is cooled in tunnel freezer 2 such that the surface temperature of the cooled product exiting tunnel freezer 2 is in the range of from about 85° F. to about −10° F.; from about 50 to about 55% of the overall heat removal achieved in tunnel freezer 2 is obtained in first treatment zone 6; the total $CO_2$ consumption in first treatment zone 1 is in the range of from about 35% to about 50% of the total $CO_2$ usage in tunnel freezer 2; from about 25 to about 30% of the overall product heat removal achieved in tunnel freezer 2 is obtained in second treatment zone 8; the total $CO_2$ consumption in second treatment zone 8 is in the range of from about 20% to about 35% of the total $CO_2$ usage in tunnel freezer 2; from about 15 to about 20% of the overall heat removal achieved in tunnel freezer 2 is obtained in third treatment zone 10; the total $CO_2$ consumption in third treatment zone 10 is in the range of from about 15% to about 30% of the total $CO_2$ usage in tunnel freezer 2; and the cooled product exiting tunnel freezer 2 is further cooled in mechanical freezer 198 such that the temperature at the center of the product is about 0° F.

In addition to the above, it is noted that, when the inventive system is used for freezing raw chicken products having skin and/or sauce on the exterior thereof, Praso valves 66, 68, 100, 104, 136, and 140 provided in the bottom of tunnel freezer 2 typically will not be used. However, regardless of whether the lower Praso valves are employed, all of bottom fans 46, 48, 82, 84, 118, and 120 will preferably be operated in order to ensure that $CO_2$ snow does not accumulate in the bottom of tunnel freezer 2.

In an alternative embodiment of the inventive freezer system, first, second, and third zone valves 188, 190, and 192 provided in conduits 182, 184, and 186 are replaced with Marsh valves. Marsh valves are commercially available, for example, from Marsh Manufacturing. As is well known in the art, a Marsh valve is a needle-type valve which can be used to reduce flow with a minimal amount of vapor flashing. Thus, a Marsh valve can be used reduce the $CO_2$ coolant supply pressure and flow rate by a substantial amount while maintaining a high quality level (i.e., a high liquid to vapor ratio). As indicated hereinabove, the use of a higher quality $CO_2$ feed increases the amount of $CO_2$ snow produced in the tunnel freezer. By using Marsh valves to individually adjust the $CO_2$ coolant flow rates to each of the tunnel freezer treatment zones, lower Praso valve set pressures (i.e., set pressures within the range commonly used heretofore in tunnel freezers) can be employed throughout the inventive tunnel freezer.

EXAMPLE

Injection marinated chicken breast fillets having exterior skin coverage and no internal supporting bone structure were frozen in an inventive freezer system of the type depicted in FIGS. 1–6. Prior to entering the inventive freezer system, the chicken product had a surface temperature of about 45° F. The freezer system was structured and operated such that: the blades of top fans 36, 74, and 110 were 14 inch blades each having a 20° pitch; the blades of bottom fans 46, 48, 82, 84, 118, and 120 were 12 inch blades each having a 20° pitch; fan motors 38, 50, and 52 used in first treatment zone 6 were variable speed motors operated at 850 RPM; fan motors 76, 86, 88, 112, 122, and 124 used in second treatment zone 8 and third treatment zone 10 were constant speed motors operating at 1800 RPM; flat plate orifices were used in first zone Praso valves 62 and 64; C-2 flow nozzles were used in second zone Praso valves 92 and 96; high impingement C-30 flow nozzles were used in third zone Praso valves 128 and 132; the lower Praso valves 66, 68, 100, 104, 136, and 140 provided in tunnel freezer 2 beneath conveyor belt 20 were not used; the set pressure of first zone Praso valves 62 and 64 was 250 psig; the set pressure of second zone Praso valves 92 and 96 was 280; the set pressure of third zone Praso valves 128 and 132 was 310; first zone Praso valves 62 and 64 were positioned at a valve/conveyor belt clearance of 6.5 inches; second zone Praso valves 92 and 96 were positioned at a valve/conveyor belt clearance of 4 inches; and third zone Praso valves 128 and 132 were positioned at a valve/conveyor belt clearance of 8 inches.

In addition to the above, the inventive freezer system was further structured and operated such that: conveyor belt 20 was about 40 inches wide; first treatment zone 6, second treatment zone 8, and third treatment zone 10 were each four feet in length; conveyor belt 20 was operated at a speed of 10 feet per minute; the breast fillets were fed to tunnel freezer 2 at a rate such that the product loading on conveyor belt 20 was 2.25 pounds of product per $ft^2$; and the $CO_2$ coolant supply pressure provided by delivery pump 176 was about 340 psig.

As the breast fillets were conveyed through tunnel freezer 2, approximately 15 Btu's per pound of product were removed from the product in first treatment zone 6, approximately 10 Btu's per pound of product were removed in second treatment zone 8, and approximately 5 Btu's per pound of product were removed in third treatment zone 10. The $CO_2$ consumption rates in first treatment zone 6, second treatment zone 8, and third treatment zone 10 were about 0.175, about 0.105, and about 0.07 pounds of $CO_2$ per pound of product, respectively. The surface of the cooled product was frozen within about one minute from the time that the product entered tunnel freezer 2. The cooled product exited tunnel freezer 2 having a surface temperature of about 10° F.

The cooled breast fillets were then completely frozen in mechanical freezer 198 such that the temperature of the frozen product was at least 0° F. throughout. Mechanical freezer 198 was a spiral-type freezer utilizing an ammonia coolant.

In addition to achieving a very low overall $CO_2$ consumption rate, the moisture loss incurred in the inventive freezing process was only about 0.5% by weight based on the total weight of the warm product. Additionally, only about 1% of the frozen product was downgraded as a result of skin damage, skin loss, or bubbling. Further, the overall marination fluid loss incurred in the inventive process was only about 0.25%.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A cooling system comprising:

a housing;

a first treatment zone provided in said housing for treating articles by injecting carbon dioxide into said first treating zone toward said articles and by circulating carbon dioxide in said first treatment zone;

a second treatment zone provided in said housing for further treating said articles by injecting carbon dioxide into said second treatment zone toward said articles and by circulating carbon dioxide in said second treatment zone; and a conveyor means for conveying said articles through said first and second treatment zones, wherein, said first and second treatment zones are operable such that, during injection, the carbon dioxide injected into said second treatment zone will impinge on said articles to a greater degree than will the carbon dioxide injected into said first treatment zone.

2. The cooling system of claim 1 wherein:

said first and second treatment zones are operable such that, when carbon dioxide is circulated in said first and second treatment zones, a greater degree of turbulence is created in said second treatment zone than is created in said first treatment zone.

3. The cooling system of claim 1 wherein:

said treatment system further comprises a third treatment zone provided in said housing for further treating said articles, after said articles have been treated in said first and second treatment zones, by injecting carbon dioxide into said third treatment zone toward said articles and by circulating carbon dioxide in said third treatment zone;

said conveyor means is operable for conveying said articles through said third treatment zone; and said third treatment zone is operable such that, during injection, the carbon dioxide injected into said third treatment zone will impinge on said articles to a greater degree than will the carbon dioxide injected into said second treatment zone.

4. The cooling system of claim 3 wherein said first and third treatment zones are operable such that when carbon dioxide is circulated in said first and third treatment zones, a greater degree of turbulence is created in said third treatment zone than is created in said first treatment zone.

5. The cooling system of claim 4 wherein said second and third treatment zones are operable such that, when carbon dioxide is circulated in said second and third treatment zones, a greater degree of turbulence is created in said third treatment zone than is created in said second treatment zone.

6. The cooling system of claim 1 wherein said first treatment zone is operable such that, during injection, the carbon dioxide being injected into said first treatment zone will not substantially impinge on said articles.

7. The cooling system of claim 6 wherein said first treatment zone is operable such that, upon injection, the carbon dioxide injected into said first treatment zone forms a carbon dioxide snow blanket which will deposit on said articles.

8. The cooling system of claim 1 further comprising means for increasing the pressure of the carbon dioxide injected into said first and second treatment zones, said means for increasing pressure comprising a pump for pumping the carbon dioxide injected into said first and second treatment zones to said first and second treatment zones.

9. The cooling system of claim 1 further comprising:

a mechanical freezer and transferring means for transferring said articles from said conveyor means to said mechanical freezer.

10. A cooling system comprising:

a housing;

a first treatment zone provided in said housing, said first treatment zone including (a) first injection means for injecting carbon dioxide into said first treatment zone and (b) first circulation means for circulating carbon dioxide in said first treatment zone;

a second treatment zone provided in said housing, said second treatment zone including (a) second injection means for injecting carbon dioxide into said second treatment zone and (b) second circulation means for circulating carbon dioxide in said second treatment zone; and a conveyor means for conveying articles to be cooled through said first and second treatment zones, said first and second injection means being operable for injecting carbon dioxide toward said articles as said articles are being conveyed by said conveyor means and said first and second injection means also being operable such that the carbon dioxide injected by said second injection means will impinge on said articles to a greater degree than will the carbon dioxide injected by said first injection means.

11. The cooling system of claim 10 wherein said first and second circulation means are operable such that the degree of turbulence created in said second treatment zone by said second circulation means will exceed the degree of turbulence created in said first treatment zone by said first circulation means.

12. The cooling system of claim 10 wherein:

said treatment system further comprises a third treatment zone provided in said housing and including (a) third injection means for injecting carbon dioxide into said third treatment zone and (b) third circulation means for circulating carbon dioxide in said third treatment zone;

said conveyor means is operable for conveying said articles through said third treatment zone;

said third injection means is operable for injecting carbon dioxide toward said articles as said articles are being conveyed by said conveyor means; and said second and third injection means are operable such that the carbon dioxide injected by said third injection means will impinge on said articles to a greater degree than will the carbon dioxide injected by said second injection means.

13. The cooling system of claim 12 wherein said first and third circulation means are operable such that the degree of turbulence created in said third treatment zone by said third circulation means will exceed the degree of turbulence created in said first treatment zone by said first circulation means.

14. The cooling system of claim 13 wherein said second and third circulation means are operable such that the degree of turbulence created in said third treatment zone by said third circulation means will exceed the degree of turbulence created in said second treatment zone by said second circulation means.

15. The cooling system of claim 10 wherein said first circulation means is independently and selectively adjustable for varying the degree of turbulence created in said first treatment zone by said first circulation means.

16. The cooling system of claim 15 wherein said second circulation means is independently and selectively adjustable for varying the degree of turbulence created in said second treatment zone by said second circulation means.

17. The cooling system of claim 10 wherein said first injection means is operable for injecting carbon dioxide into said first treatment zone such that, as said articles are conveyed through said first treatment zone, said first injection means will deposit a carbon dioxide snow blanket on said articles.

18. The cooling system of claim 17 wherein said first injection means comprises a plurality of Praso valves having flat-plate orifices provided therein.

19. The cooling system of claim 18 wherein said second injection means comprises a plurality of Praso valves having second zone flow nozzles provided therein, said second zone flow nozzles having barrel lengths in the range of from about 2 to about 6 mm.

20. The cooling system of claim 18 wherein:
said cooling system further comprises a third treatment zone including (a) third injection means for injecting carbon dioxide into said third treatment zone and (b) third circulation means for circulating carbon dioxide in said third treatment zone;
said conveyor means is operable for conveying said articles through said third treatment zone;
said third injection means is operable for injecting carbon dioxide toward said articles as said articles are being conveyed by said conveyor means;
said second and third injection means are operable such that the carbon dioxide injected by said third injection means will impinge on said articles to a greater degree than will the carbon dioxide injected by said second injection means;
said first and third circulation means are operable such that the degree of turbulence created in said third treatment zone by said third circulation means is greater than the degree of turbulence created in said first treatment zone by said first circulation means; and
said third injection means comprises a plurality of Praso valves having third zone flow nozzles provided therein, said third zone flow nozzles having barrel lengths in the range of from about 25 to about 33 mm.

21. The cooling system of claim 20 wherein each of said second zone flow nozzles has a barrel length of about 2 mm and each of said third zone flow nozzles has a barrel length of about 30 mm.

22. The cooling system of claim 10 further comprising pressure increasing means for increasing the pressure of the carbon dioxide injected into said treatment zones, said pressure increasing means comprising a pump for pumping carbon dioxide to said first and second injection means.

23. The cooling system of claim 10 further comprising:
a mechanical freezer and
transferring means for transferring said articles from said conveyor means to said mechanical freezer.

24. A method of treating articles comprising the steps of:
(a) conveying said articles through a first treatment zone provided in a tunnel-type cooler;
(b) as said articles are conveyed through said first treatment zone, injecting carbon dioxide into said first treatment zone toward said articles and circulating carbon dioxide in said first treatment zone;
(c) following step (a), conveying said articles through a second treatment zone provided in said tunnel-type cooler; and
(d) as said articles are conveyed through said second treatment zone, injecting carbon dioxide into said second treatment zone toward said articles and circulating carbon dioxide in said second treatment zone;
wherein the carbon dioxide injected into said second treatment zone in accordance with step (d) impinges on said articles to a greater degree than does the carbon dioxide injected into said first treatment zone in accordance with step (b).

25. The method of claim 24 wherein carbon dioxide is circulated in said treatment zones in steps (d) and (b) in a manner such that a greater degree of turbulence is created in said second treatment zone during step (d) than is created in said first treatment zone during step (b).

26. The method of claim 24 wherein:
said method further comprises the step, after step (c), of (e) conveying said articles through a third treatment zone provided in said tunnel-type cooler;
said method also comprises the step, as said articles are conveyed through said third treatment zone, of (f) injecting carbon dioxide into said third treatment zone toward said articles and circulating carbon dioxide in said third treatment zone; and
the carbon dioxide injected into said third treatment zone in accordance with step (f) impinges on said articles to a greater degree than does the carbon dioxide injected into said second treatment zone in accordance with step (d).

27. The method of claim 26 wherein carbon dioxide is circulated in said first and third treatment zones in accordance with steps (b) and (f) such that a greater degree of turbulence is created in said third treatment zone during step (f) than is created in said first treatment zone during step (b).

28. The method of claim 26 wherein, upon injection, the carbon dioxide injected into said first treatment zone in step (b) forms a carbon dioxide snow blanket which deposits on said articles.

29. An article treated in accordance with the method of claim 28.

30. The method of claim 28 wherein said articles are chicken items having skin, sauce, or a combination thereof on the exterior thereof.

31. An article treated in accordance with the method of claim 30.

32. The method of claim 26 wherein carbon dioxide is circulated in said second and third treatment zones in accordance with steps (d) and (f) such that a greater degree of turbulence is created in said third treatment zone during step (f) than is created in said second treatment zone during step (d).

33. The method of claim 26 wherein:
carbon dioxide is injected into said first treatment zone in accordance with step (b) through a plurality of Praso valves having flat plate orifices provided therein;
carbon dioxide is injected into said second treatment zone in accordance with step (d) through a plurality of Praso valves having second zone flow nozzles provided therein, said second zone flow nozzles having barrel lengths in the range of from about 2 to about 6 mm; and
carbon dioxide is injected into said third treatment zone in accordance with step (f) through a plurality of Praso valves having third zone flow nozzles provided therein, said third zone flow nozzles having barrel lengths in the range of from about 25 to about 33 mm.

34. An article treated in accordance with the method of claim 33.

35. The method of claim 33 wherein said articles are chicken items having skin, sauce, or a combination thereof on the exterior thereof.

36. An article treated in accordance with the method of claim 35.

37. The method of claim 24 further comprising the step, prior to step (b), of increasing the pressure of the carbon dioxide injected into said first treatment zone in step (b) by pumping.

38. The method of claim 24 wherein, upon injection, the carbon dioxide injected into said first treatment zone in step (b) forms a carbon dioxide snow blanket which deposits on said articles.

39. The method of claim 38 wherein said articles are chicken items having skin, sauce, or a combination thereof on the exterior thereof.

40. The method of claim 39 further comprising the step, following step (d), of conducting said articles through a mechanical freezer.

41. An article treated in accordance with the method of claim 40.

42. The method of claim 40 wherein:

carbon dioxide is injected into said first treatment zone in accordance with step (b) through a plurality of Praso valves having flat plate orifices provided therein; and carbon dioxide is injected into said second treatment zone in accordance with step (d) through a plurality of Praso valves having second zone flow nozzles provided therein, said second zone flow nozzles having barrel lengths in the range of from about 2 to about 6 mm.

43. An article treated in accordance with the method of claim 42.

44. An article treated in accordance with the method of claim 24.

45. A chicken product formed by a method comprising the steps of:

(a) conveying chicken items through a first treatment zone provided in a tunnel-type cooler;

(b) as said chicken items are conveyed through said first treatment zone, injecting carbon dioxide into said first treatment zone toward said chicken portions and circulating carbon dioxide in said first treatment zone;

(c) following step (a), conveying said chicken items through a second treatment zone provided in said tunnel-type cooler; and (d) as said chicken items are conveyed through said second treatment zone, injecting carbon dioxide into said second treatment zone toward said chicken items and circulating carbon dioxide in said second treatment zone, wherein, upon injection, the carbon dioxide injected into said first treatment zone in step (b) forms a carbon dioxide snow blanket which deposits on said chicken items, and wherein the carbon dioxide injected into said second treatment zone in accordance with step (d) impinges on said chicken items to a greater degree than does the carbon dioxide injected into said first treatment zone in accordance with step (b).

46. The chicken product of claim 45 wherein carbon dioxide is circulated in said treatment zones in steps (b) and (d) in a manner such that a greater degree of turbulence is created in said second treatment zone during step (d) than is created in said first treatment zone during step (b).

47. The chicken product of claim 45 wherein carbon dioxide is injected into said first treatment zone in accordance with step (b) through a plurality of Praso valves having flat plate orifices provided therein.

48. The chicken product of claim 47 wherein carbon dioxide is injected into said second treatment zone in accordance with step (d) through a plurality of Praso valves having second zone flow nozzles provided therein, said second zone flow nozzles having barrel lengths in the range of from about 2 to about 6 mm.

49. The chicken product of claim 45 wherein:

said method further comprises the step, after step (c), of (e) conveying said chicken items through a third treatment zone provided in said tunnel-type cooler;

said method also comprises the step, as said chicken items are conveyed through said third treatment zone, of (f) injecting carbon dioxide into said third treatment zone toward said chicken items and circulating carbon dioxide in said third treatment zone;

the carbon dioxide injected into said third treatment zone in accordance with step (f) impinges on said chicken items to a greater degree than does the carbon dioxide injected into said second treatment zone in accordance with step (d); and carbon dioxide is circulated in said first and third treatment zones in accordance with steps (b) and (f) such that a greater degree of turbulence is created in said third treatment zone during step (f) than is created in said first treatment zone during step (b).

50. The chicken product of claim 49 wherein:

carbon dioxide is injected into said second treatment zone in accordance with step (d) through a plurality of Praso valves having second zone flow nozzles provided therein, said second zone flow nozzles having barrel lengths in the range of from about 2 to about 6 mm; and carbon dioxide is injected into said third treatment zone in accordance with step (f) through a plurality of Praso valves having third zone flow nozzles provided therein, said third zone flow nozzles having barrel lengths in the range of from about 25 to about 35 mm.

51. The chicken product of claim 45 wherein said method further comprises the step, following step (c), of freezing said chicken items in a mechanical freezer.

* * * * *